US009348959B1

(12) United States Patent
Tuan (10) Patent No.: US 9,348,959 B1
(45) Date of Patent: May 24, 2016

(54) OPTIMIZING SUPPLY VOLTAGE AND THRESHOLD VOLTAGE

(75) Inventor: Tim Tuan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 445 days.

(21) Appl. No.: 13/537,440

(22) Filed: Jun. 29, 2012

(51) Int. Cl.
*G06G 7/54* (2006.01)
*G06F 17/50* (2006.01)
*G06F 1/32* (2006.01)

(52) U.S. Cl.
CPC ............ *G06F 17/505* (2013.01); *G06F 1/3203* (2013.01); *G06F 17/5077* (2013.01)

(58) Field of Classification Search
CPC .............. G06F 17/505; G06F 17/5077; G06F 17/5072; G06F 1/3203; H03K 19/0008
USPC .......................................................... 703/18
See application file for complete search history.

(56) References Cited

U.S. PATENT DOCUMENTS

| | | | |
|---|---|---|---|
| 6,950,998 B1* | 9/2005 | Tuan ............................ | 716/113 |
| 7,243,312 B1* | 7/2007 | Lysaght et al. ................ | 716/104 |
| 7,525,373 B1* | 4/2009 | Ogilvie ................. | G06F 1/3296 327/564 |
| 7,551,985 B1* | 6/2009 | Chen et al. ..................... | 700/297 |
| 7,689,942 B2* | 3/2010 | Acar et al. ..................... | 716/134 |
| 7,714,610 B2* | 5/2010 | He ................................. | 326/41 |
| 8,130,027 B1* | 3/2012 | Tuan ....................... | G11C 5/147 327/153 |
| 8,198,914 B2* | 6/2012 | Lee et al. ........................ | 326/41 |
| 2004/0128631 A1* | 7/2004 | Ditzel et al. ...................... | 716/2 |
| 2006/0202713 A1* | 9/2006 | Shumarayev .................... | 326/38 |
| 2007/0040577 A1* | 2/2007 | Lewis .............. | H03K 19/17784 326/41 |
| 2007/0164785 A1* | 7/2007 | He ....................... | G06F 17/5058 326/41 |
| 2007/0205824 A1* | 9/2007 | Perisetty ............ | H03K 19/0013 327/536 |
| 2009/0072857 A1* | 3/2009 | Perisetty ............ | H03K 19/0016 326/38 |
| 2010/0194469 A1* | 8/2010 | Amrutur et al. .............. | 327/538 |
| 2015/0116030 A1* | 4/2015 | Jarrar ................... | H03K 17/162 327/536 |

OTHER PUBLICATIONS

Basu et al. ("Simultaneous Optimization of Supply and Threshold Voltages for Low-Power and High-Performance Circuits in the Leakage Dominant Era", ACM, 2004, pp. 884-887).*
Pant et al. ("Simultaneous Power Supply, Threshold Voltage, and Transistor Size Optimization for Low-Power Operation of CMOS Circuits", IEEE, 1998, pp. 538-545).*
Pant et al. ("Dual-Threshold Voltage Assignment with Transistor Sizing for Low Power CMOS Circuits", IEEE, 2001, pp. 390- 394).*
Nose et al. ("Optimization of VDD and VTH for Low-Power and High-Speed Applications", IEEE, 2000, pp. 469-474).*
Kursun et al. ("Supply and Threshold Voltage Scaling Techniques in CMOS Circuits",University of Rochester, 2004, pp. 1-330).*

* cited by examiner

*Primary Examiner* — Omar Fernandez Rivas
*Assistant Examiner* — Iftekhar Khan
(74) *Attorney, Agent, or Firm* — Gerald Chan; LeRoy D. Maunu (57) ABSTRACT

A method for determining or configuring supply voltage and threshold voltage for a design implementation of a given electronic design, includes: determining a first set of supply voltage-threshold voltage combinations that meet timing requirements for the design implementation; performing power analysis using a processor; and selecting a supply voltage-threshold voltage combination from the first set of supply voltage-threshold voltage combinations based at least in part on a result from the power analysis, wherein the selected supply voltage-threshold voltage combination provides an optimal amount of power consumption for the design implementation.

18 Claims, 5 Drawing Sheets

OPTIMIZING SUPPLY VOLTAGE AND THRESHOLD VOLTAGE

FIELD OF THE APPLICATION

An embodiment relates generally to optimization of supply voltage and threshold voltages, and in particular to a combined approach for optimizing supply voltage and threshold voltage for performance and power consumption.

BACKGROUND

For integrated circuits (ICs), supply voltage (Vdd) and threshold voltage (Vth) both strongly affect the power consumption and performance (e.g., ability to meet timing requirements) of the circuit. Traditionally, supply voltage (Vdd) and threshold voltage (Vth) are fixed values that are set by the design/manufacturing process. In recent years, it has become common to adjust the supply voltage (Vdd) through programmable regulators and to adjust the threshold voltage (Vth) through back biasing transistors. While supply voltages (Vdd) and threshold voltages (Vth) are capable of being adjusted, methods for identifying optimal supply voltages (Vdd) and optimal threshold voltages (Vth) for power consumption and performance are largely independent processes. These approaches allow supply voltages and threshold voltages to be adjusted in order to increase performance characteristics at the cost of consuming more power or vice versa.

SUMMARY

In accordance with some embodiments, a method for determining or configuring supply voltage and threshold voltage for a design implementation of a given electronic design, includes: determining a first set of supply voltage-threshold voltage combinations that meet timing requirements for the design implementation; performing power analysis using a processor; and selecting a supply voltage-threshold voltage combination from the first set of supply voltage-threshold voltage combinations based at least in part on a result from the power analysis, wherein the selected supply voltage-threshold voltage combination provides an optimal amount of power consumption for the design implementation.

In one or more embodiments, the timing requirements for the design implementation are based on design constraints associated with the electronic design.

In one or more embodiments, the design implementation meets a set of design constraints for the electronic design.

In one or more embodiments, the timing requirements for the design implementation comprise silicon speed requirements of the design implementation.

In one or more embodiments, the act of determining the first set of supply-threshold voltage combinations that meet timing requirements for the design implementation comprises using a lookup table.

In one or more embodiments, the act of performing the power analysis comprises determining an amount of power consumption for each supply voltage-threshold voltage combination in the first set of the supply voltage-threshold voltage combinations.

In one or more embodiments, the act of performing the power analysis comprises performing simulation or estimation of switching activity.

In one or more embodiments, the act of performing the power analysis comprises determining power consumption characteristics for a second set of supply voltage-threshold voltage combinations, and the act of selecting comprises comparing power consumption characteristics for the first set of supply voltage-threshold voltage combinations with the power consumption characteristics for the second set of supply voltage-threshold voltage combinations.

In one or more embodiments, the power analysis comprises a static power analysis and a dynamic power analysis.

In one or more embodiments, the optimal amount of power consumption is a minimum amount of dynamic power consumption or a minimum amount of static power consumption.

In one or more embodiments, the method further includes configuring a supply voltage and body bias voltages that regulate the physical implementation of the electronic design using the selected supply voltage-threshold voltage combination.

In one or more embodiments, the supply voltage is configured using a supply voltage of the selected supply voltage-threshold voltage combination, and the body bias voltages are configured using a threshold voltage of the selected supply voltage-threshold voltage combination.

In one or more embodiments, the body bias voltages are used to tune transistors in the physical implementation of the electronic design.

In accordance with other embodiments, a system includes a memory configured to store a selected supply voltage-threshold voltage combination, an integrated circuit, a first regulator coupled between the memory and the integrated circuit, wherein the first regulator is configured to regulate a supply voltage of the integrated circuit using the selected supply voltage-threshold voltage combination, and a second regulator coupled between the memory and the integrated circuit, wherein the second regulator is configured to regulate a body bias voltage of the integrated circuit using the selected supply voltage-threshold voltage combination, wherein the integrated circuit implements a circuit design and the selected supply voltage-threshold voltage combination provides an optimal amount of power for the circuit design.

In one or more embodiments, the system further includes a third regulator coupled between the memory and the integrated circuit, the third regulator configured to regulate another body bias voltage of the integrated circuit using the selected supply voltage-threshold voltage combination.

In one or more embodiments, the body bias voltage and the other body bias voltage are for tuning transistors in a physical implementation of the circuit design.

In one or more embodiments, the memory stores the selected supply voltage-threshold voltage combination as a bitstream.

In one or more embodiments, the system further includes a processor configured to select the supply voltage-threshold voltage combination by determining a set of supply voltage-threshold voltage combinations that meet timing requirements for the circuit design, performing power analysis, and selecting the supply voltage-threshold voltage combination from the set of supply voltage-threshold voltage combinations based at least in part on a result from the power analysis.

In one or more embodiments, the first regulator is configured to regulate the supply voltage of the integrated circuit using a supply voltage of the selected supply voltage-threshold voltage combination, and the second regulator is configured to regulate the body bias voltage using a threshold voltage of the selected supply voltage-threshold voltage combination.

In accordance with other embodiments, a non-transitory machine-readable medium includes instructions, an execution of which by a processor causes a method to be performed, the method comprising determining a first set of supply voltage-threshold voltage combinations that meet timing requirements for a design implementation, performing power analysis, and selecting a supply voltage-threshold voltage combination from the first set of supply voltage-threshold voltage combinations based at least in part on a result from the power analysis, wherein the selected supply voltage-threshold voltage combination provides an optimal amount of power consumption for the design implementation.

Other and further aspects and features will be evident from reading the following detailed description of the embodiments.

BRIEF DESCRIPTION OF THE DRAWINGS

The drawings illustrate the design and utility of embodiments, in which similar elements are referred to by common reference numerals. These drawings are not necessarily drawn to scale. In order to better appreciate how the above-recited and other advantages and objects are obtained, a more particular description of the embodiments will be rendered, which are illustrated in the accompanying drawings. These drawings depict only typical embodiments and are not therefore to be considered limiting of the scope of the claims.

DETAILED DESCRIPTION

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the claimed invention. In addition, an illustrated embodiment need not have all the aspects or advantages shown. An aspect or an advantage described in conjunction with a particular embodiment is not necessarily limited to that embodiment and can be practiced in any other embodiments even if not so illustrated, or if not so explicitly described. Also, reference throughout this specification to "some embodiments" or "other embodiments" means that a particular feature, structure, material, or characteristic described in connection with the embodiments is included in at least one embodiment. Thus, the appearances of the phrase "in some embodiments" or "in other embodiments" in various places throughout this specification are not necessarily referring to the same embodiment or embodiments.

For integrated circuits (ICs), supply voltage (Vdd) and threshold voltage (Vth) may affect the power consumption and performance (e.g., speed) of the circuit. In some cases, it may be possible to adjust the supply voltage (Vdd) for ICs through programmable regulators and to adjust the threshold voltage (Vth) for ICs through back biasing transistors. An approach for identifying optimal supply voltages (Vdd) and optimal threshold voltages (Vth) for power consumption and for performance may involve using independent processes. Such an approach allows supply voltages and threshold voltages to be adjusted in order to increase performance characteristics at the cost of consuming more power or vice versa.

According to some embodiments, a method for combined optimization of supply voltage and threshold voltage for both performance and power consumption is described. The method for combined optimization allows the supply voltage (Vdd) and threshold voltage (Vth) to be optimized such that timing requirements of the IC are met or exceeded while power consumption is minimized. In this way, the supply voltage (Vdd) and threshold voltage (Vth) can be optimized for both performance and power consumption. It should be noted that within the context of this specification, an item described as "optimal" may refer to the item being desirable and/or better than another item, and thus, the term "optimal" may or may not refer to an item that is the very best. Similar concept applies to other similar terms, such as "optimized", "optimization", etc.

The performance (e.g., ability to meet timing requirements) of an IC is a function of both supply voltage (Vdd) and threshold voltage (Vth). The relationship between the performance of the IC and both the supply voltage (Vdd) and threshold voltage (Vth) can be approximated by the following equation:

$$\text{delay} = kVdd/(Vdd-Vth)^\alpha$$

The ability to meet performance criteria (e.g., timing requirements) may be characterized by the delay associated with a particular design implementation. $\alpha$ is a process constant and k is a variable that is a function of both the process parameters and design parameters for the particular design implementation being used. The design implementation refers to a particular implementation of a user design for an IC that meets particular design constraints, which will be described in greater detail below.

Figure 1:
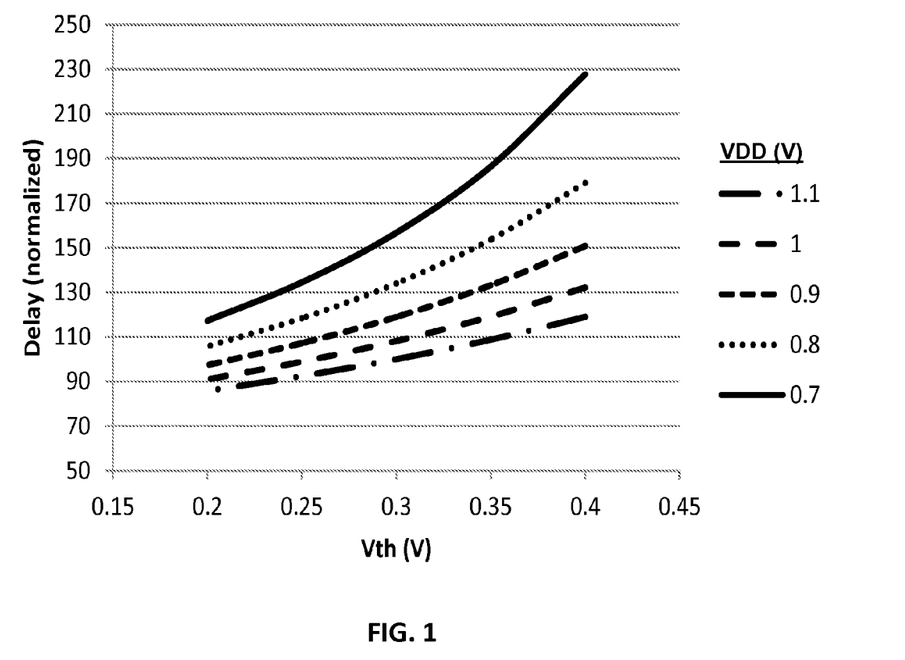
FIG. 1 illustrates a relationship between supply voltage and threshold voltage in the context of IC performance.

FIG. 1 illustrates a relationship between supply voltage and threshold voltage in the context of IC performance (e.g., delay). FIG. 1 illustrates the relationship between supply voltage, threshold voltage, and delay (e.g., ability to meet timing requirements) for a design implementation with process constant of $\alpha=1.3$. The x-axis represents a range of threshold voltage (Vth) values from 0.15 V to 0.45V. The different curves correspond to different supply voltage (Vdd) values ranging from 0.7 to 1.1. The y axis represents a range of delay values for various supply voltage (Vdd) and threshold voltage (Vth) combinations.

As can be seen from FIG. 1, any given IC delay can be achieved with multiple combinations of supply voltage (Vdd) and threshold voltage (Vth) values. For example, a delay of 120 can be achieved with Vdd=0.7V and Vth=0.2V, Vdd=0.8V and Vth=0.25V, Vdd=0.9V and Vth=0.3V, etc.

While multiple combinations of supply voltage (Vdd) and threshold voltage (Vth) can achieve the same IC performance requirements, not all combinations will consume the same amount of power. Thus, for the same delay value, some combinations of supply voltage (Vdd) and threshold voltage (Vth) will exhibit high power consumption while some combinations of supply voltage (Vdd) and threshold voltage (Vth) will exhibit lower power consumption.

Power consumption of an IC is also heavily dependent on the values of supply voltage (Vdd) and threshold voltage (Vth). The relationship between the power consumption of an IC and both the supply voltage (Vdd) and threshold voltage (Vth) can be approximated by the following equation:

$$P = CVdd^2 f + I_0 Vdd * 10^{(Vdd-Vth)/S}$$

The variables C, f, $I_0$, and S are design implementation parameters that vary from one design implementation to another. C represents the switched capacitance of an IC, f represents the average frequency at which C is switched, $I_0$ is a constant proportional to transistor sizes for an IC, and S is a process constant referred to as subthreshold slope. The term $CVdd^2 f$ represents the dynamic power consumption of the IC and the term $I_0 Vdd * 10^{(Vdd-Vth)/S}$ represents the static power consumption of the IC. It is important to note that this equation merely illustrates the relationship between power consumption of an IC and supply voltage (Vdd) and threshold voltage (Vth) of the IC, and does not include all components for determining power consumption for purposes of simplicity.

As can be seen from the above equation, for multiple supply voltage (Vdd) and threshold voltage (Vth) combinations that satisfy IC performance requirements, the amount of power consumed by such supply voltage (Vdd) and threshold voltage (Vth) combinations will vary. Moreover, the amount of dynamic power and static power consumed will vary for different supply voltage (Vdd) and threshold voltage (Vth) combinations.

Thus, simply adjusting supply (Vdd) and threshold voltage (Vth) for a given IC to satisfy performance requirements will not necessarily lead to ideal (e.g., desired) power consumption. Likewise, simply adjusting supply voltage (Vdd) and threshold voltage (Vth) for a given IC to minimize power consumption (e.g., dynamic power consumption or static power consumption or both) will not necessarily lead to satisfaction of performance requirements.

It is important to note that while the above example was described with respect to supply voltage (Vdd) and threshold voltage (Vth) combinations, a design implementation may have various supply voltage (Vdd) and threshold voltage (Vth) combinations (e.g., any number of supply voltages and any number of threshold voltages) for which performance and power consumption relationships may be determined.

Figure 2:
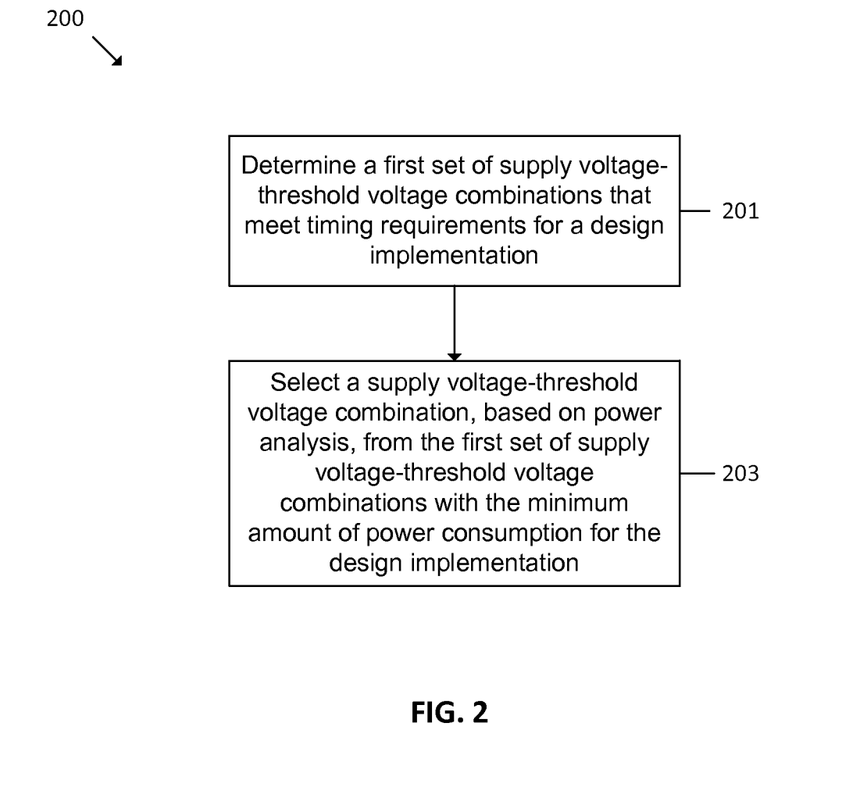
FIG. 2 is a flowchart illustrating a method for combined optimization of supply voltage and threshold voltage for both performance and power consumption associated with a design implementation of an electronic design according to some embodiments.

FIG. 2 is a flowchart illustrating a method 200 for combined optimization of supply voltage and threshold voltage for both performance and power consumption associated with a design implementation of an electronic design (also referred to as a circuit design) according to some embodiments. This approach allows for the supply voltage (Vdd) and threshold voltage (Vth) to be optimized such that performance requirements of the IC is met or exceeded and power consumption of the IC is optimized.

A first set of supply voltage threshold voltage combinations that meet timing requirements for a design implementation are determined as described at 201. In some embodiments, each supply voltage threshold voltage combination represents a supply voltage threshold voltage combination. In other embodiments, each supply voltage threshold voltage combination represents multiple supply voltages or multiple threshold voltages. In some embodiments all supply voltage threshold voltage combinations that meet or exceed timing requirements are determined.

In some embodiments, the first set of supply voltage threshold voltage combinations that meet timing requirements may be determined using a lookup table that identifies delay characteristics for various supply voltage threshold voltage combinations. For example, a lookup table may include entries that describe supply voltage threshold voltage combinations and their corresponding delay characteristic. Such delay characteristic could be, for example, a derating factor relative to the delay under nominal Vdd and Vth settings. Those supply voltage threshold voltage combinations with corresponding delay characteristics that meet or exceed timing requirements may then be chosen.

In other embodiments, various supply voltages (Vdd) may be plotted against a range of threshold voltages (Vth) to determine their delay characteristics, much like FIG. 1. The relationship between supply voltage (Vdd), threshold voltage (Vth), and delay characteristics may be modeled using formulas similar to those described above. The various supply voltage (Vdd) threshold voltage (Vth) combinations with corresponding delay characteristics that meet or exceed timing requirements may then be chosen.

Once the first set of supply voltage threshold voltage combinations has been determined, a supply voltage threshold voltage combination that results in an optimal amount of power consumption for the design implementation is selected from the first set of supply voltage threshold voltage combinations based on power analysis as described at 203.

In some embodiments, the optimal amount of power consumption may be a minimum amount of total power consumption. In other embodiments, the optimal amount of power consumption may be a minimum amount of dynamic power consumption. In other embodiments, the optimal amount of power consumption may be a minimum amount of static power consumption. It is important to note that the optimal amount of power consumption may vary depending on the particular application of the design implementation.

In some embodiments, power analysis may be performed for each supply voltage threshold voltage combination of the first set of supply voltage threshold voltage combinations to determine an amount of power consumption for each supply voltage threshold voltage combination of the first set of supply voltage threshold voltage combinations. Such power analysis may be performed using power models, and may involve simulation or estimation of switching activity. The power analysis may include dynamic power analysis to determine dynamic power consumption and static power analysis to determine static power consumption. The supply voltage threshold voltage combination with the optimal amount of power consumption may then be selected.

In other embodiments, power analysis may be performed on the design implementation itself in order to determine power consumption characteristics for various ranges of supply voltage and threshold voltage. Power analysis on the design implementation may be performed using power models, and may involve simulation or estimation of switching activity. Such power analysis may result in a second set of supply voltage threshold voltage combinations and their corresponding power consumption characteristics. The power consumption characteristics may correspond to the total power consumption, the dynamic power consumption, or the static power consumption. The second set of supply voltage threshold voltage combinations and their corresponding power consumption characteristics may then be compared to the power consumption characteristics for the first set of supply voltage threshold voltage combinations that meet or exceed timing requirements for the design implementation, to thereby determine an optimal supply voltage threshold voltage combination that meets or exceed timing requirements and optimizes power consumption.

Figure 3:
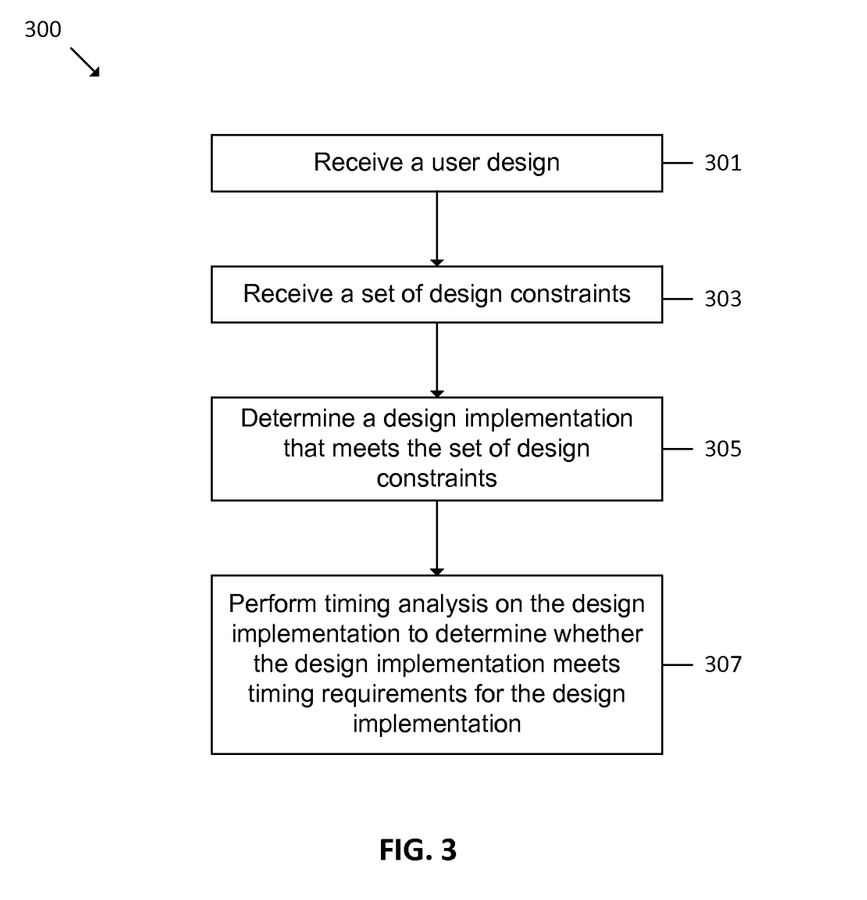
FIG. 3 illustrates a method for determining design implementations and corresponding timing requirements for an electronic design according to some embodiments.

FIG. 3 illustrates a method 300 for determining design implementations and corresponding timing requirements for an electronic design according to some embodiments. A user design (e.g., electronic design) may first be received as described at 301. The user design may be a high level description of an IC. A set of design constraints may then be received as described at 303. The design constraints may designate various design parameters that any design implementation resulting from the user design must meet.

Once the user design and design constraints have been received, a design implementation may be determined that meets the set of design constraints as described at 305. The design implementation may configure components specified in the user design to meet design constraints. It is important to note that more than one design implementation may be determined, however for purposes of example, only a single design implementation meeting design constraints will be determined. In some embodiments, the design implementation meets a set of design constraints for the electronic design. In other embodiments, the design implementation exceeds a set of design constraints for the electronic design.

After determining the design implementation that satisfies the set of design constraints, timing analysis may be performed on the design implementation to determine whether the design implementation meets timing requirements for the design implementation as described at 307. The timing requirements specify particular performance/delay characteristics that must be met in order for the design implementation to be operable. The timing analysis may utilize the design constraints in order to determine timing requirements. In some embodiments the timing requirements that are determined are silicon performance requirements for the design implementation. A first set of supply voltage threshold voltage combinations that meet the timing requirements are then determined as described in FIG. 2.

Thus, FIGS. 2 and 3 describe methods for determining a design implementation and corresponding timing requirements from a user design and a set of design constraints, as well as methods for selecting a supply voltage threshold voltage combination that meets timing requirements and optimizes power consumption for the design implementation.

While the above description has been described with reference to optimizing threshold voltage (Vth) for an integrated circuit, in some embodiments the threshold voltage may actually be transformed into body bias voltages to regulate transistors in the integrated circuit. It is important to note that in different processes, body biasing may have significant physical differences. Additionally, while the following example provides an example of transforming the threshold voltage (Vth) into body bias voltages, one ordinarily skilled in the art will recognize that other threshold voltage (Vth) transformations may be performed to facilitate optimization of threshold voltage (Vth).

Figure 4:
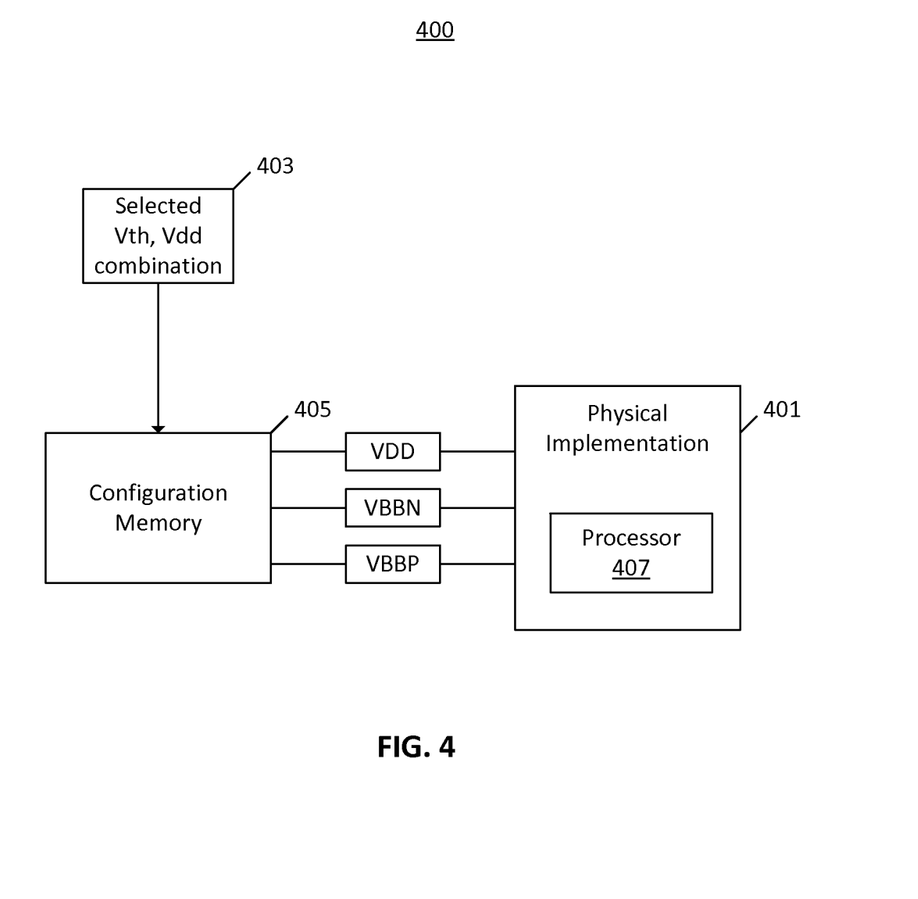
FIG. 4 illustrates a programmable system that utilizes that the method for optimizing supply voltage and threshold voltage according to some embodiments.

The method for combined optimization of supply voltage and threshold voltage for performance and power consumption for a design implementation of an electronic design may be used to program a physical implementation of the design implementation. FIG. 4 illustrates a system 400 that includes a programmable physical implementation 401 of an electronic design. The physical implementation 401 of the electronic design is the actual physical IC after the design implementation has undergone manufacturing.

The selected supply voltage threshold voltage combination 403 may be stored as a bitstream in a configuration memory 405 associated with the physical implementation 401 of the electronic design. The configuration memory 405 may store the actual values of the selected threshold voltage and supply voltage 403. Alternatively, the configuration memory 405 may store body bias voltages corresponding to the selected threshold voltage. In FIG. 4, the configuration memory 405 stores the selected supply voltage value, and two body bias voltage values which have been transformed from the selected threshold voltage. Such values may then be used to program the regulators VDD, VBBN, VBBP that supply the supply voltage and body bias voltages to the physical implementation 401 of the electronic design. While the above example describes the threshold voltage (Vth) as being transformed into two body bias voltages, one ordinarily skilled in the art will recognize that the threshold voltage (Vth) may be transformed into various numbers of body bias voltages depending on the particular application.

While FIG. 4 illustrates the programming of regulators VDD, VBBN, VBBP that supply threshold and body bias voltages to a programmable physical implementation 401 of the electronic design, it is important to note that the method for combined optimization of supply voltage and threshold voltage for performance and power consumption may also be used to explicitly set regulators that supply threshold voltage and body bias voltages in non-programmable implementations.

In some embodiments, the physical implementation 401 may include a processor 407 configured to use the data in the configuration memory 405 for programming the regulators VDD, VBBN, VBBP. In other embodiments, a processor separate from the physical implementation 401 is configured to use the data in the configuration memory 405 for programming the regulators VDD, VBBN, VBBP.

Figure 5:
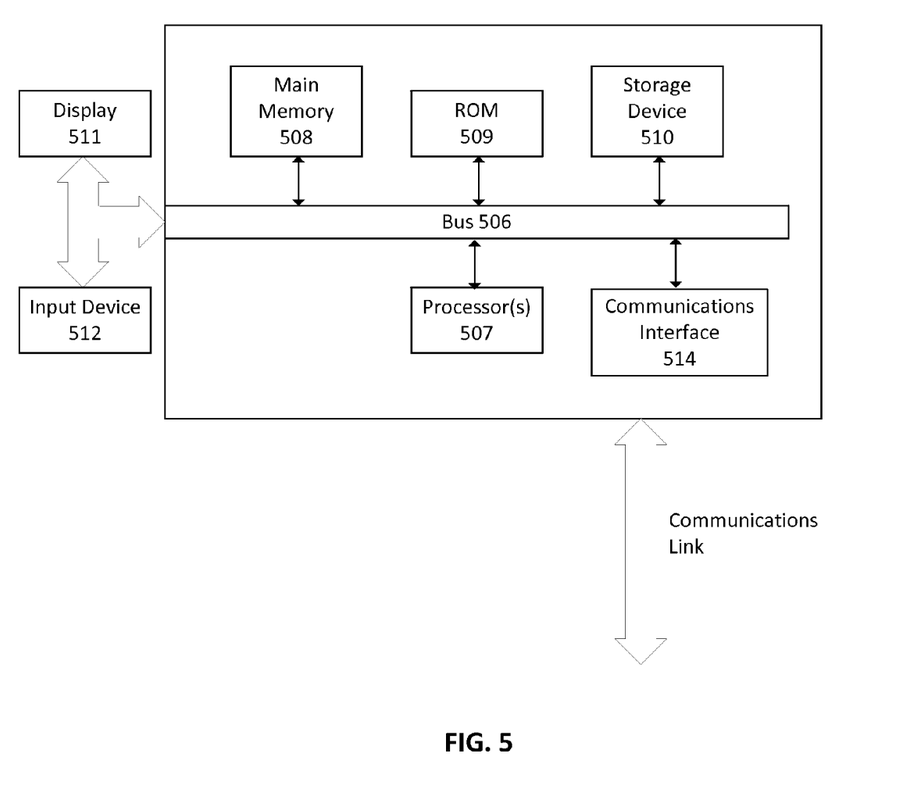
FIG. 5 is a block diagram of an illustrative computing system suitable for implementing one or more embodiments described herein.

In one or more embodiments, any or a combination of the acts in the method 200 or method 300 may be performed using a processor, which may be implemented using a combination of hardware and software. In some embodiments, the processor may also be used to configure the physical implementation. In some embodiments, the processor may be a part of the physical implementation (e.g., physical implementation 401), or may be a part of a system that is separate from the physical implementation (e.g., a computing system). FIG. 5 is a block diagram of an illustrative computing system 500 suitable for implementing one or more embodiments described herein. Computer system 500 includes a bus 506 or other communication mechanism for communicating information, which interconnects subsystems and devices, such as processor 507, system memory 508 (e.g., RAM), static storage device 509 (e.g., ROM), disk drive 510 (e.g., magnetic or optical), communication interface 514 (e.g., modem or Ethernet card), display 511 (e.g., CRT or LCD), input device 512 (e.g., keyboard), and cursor control.

According to one embodiment, computer system 500 performs specific operations by processor 507 executing one or more sequences of one or more instructions contained in system memory 508. Such instructions may be read into system memory 508 from another computer readable/usable medium, such as static storage device 509 or disk drive 510. In alternative embodiments, hard-wired circuitry may be used in place of or in combination with software instructions to implement one or more features described herein. Thus, embodiments described herein are not limited to any specific combination of hardware circuitry and/or software. In one embodiment, the term "logic" may mean any combination of software or hardware that is used to implement all or part of the features described herein.

The term "computer readable medium" or "computer usable medium" as used herein refers to any medium that participates in providing instructions to processor 507 for execution. Such a medium may take many forms, including but not limited to, non-volatile media and volatile media. Non-volatile media includes, for example, optical or magnetic disks, such as disk drive 510. Volatile media includes dynamic memory, such as system memory 508.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In some embodiments, execution of the sequences of instructions to practice the features described herein may be performed by a single computer system 500. According to other embodiments, two or more computer systems 500 coupled by communication link 515 (e.g., LAN, PTSN, or wireless network) may perform the sequence of instructions required to practice the features described herein in coordination with one another.

Computer system 500 may transmit and receive messages, data, and instructions, including program, i.e., application code, through communication link 515 and communication interface 514. Received program code may be executed by processor 507 as it is received, and/or stored in disk drive 510, or other non-volatile storage for later execution.

Although particular embodiments have been shown and described, it will be understood that they are not intended to limit the claimed invention, and it will be made obvious to those skilled in the art that various changes and modifications may be made without departing from the spirit and scope of the claimed invention. The specification and drawings are, accordingly, to be regarded in an illustrative rather than restrictive sense. The claimed invention is intended to cover alternatives, modifications, and equivalents.

What is claimed is:

1. A method for determining or configuring supply voltage and threshold voltage for a design implementation of a given electronic design, comprising:
    determining, from a set of supply voltage-threshold voltage combinations, a first subset of supply voltage-threshold voltage combinations that meet timing requirements for the design implementation;
    using a processor to determine amounts of power consumption of the design implementation for the first subset of the supply voltage-threshold voltage combinations;
    selecting a supply voltage-threshold voltage combination from the first subset of supply voltage-threshold voltage combinations having a lowest determined amount of power consumption;
    determining a first body bias voltage value and a second bias body voltage value that provide the threshold voltage of the selected supply voltage-threshold voltage combination on a programmable IC; and
    storing a bitstream in a configuration memory, the bitstream configured to:
        cause a first regulator to regulate a supply voltage of the programmable integrated circuit (IC) using the supply voltage of the selected supply voltage-threshold voltage combination;
        cause a second regulator to regulate a first body bias voltage of the programmable IC using the first body bias voltage value; and
        cause a third regulator to regulate a second body bias voltage of the programmable IC using the second body bias voltage value.

2. The method of claim 1, wherein:
    the timing requirements for the design implementation are based on design constraints associated with the electronic design; and
    amounts of power consumption are only determined for the supply voltage-threshold voltage combinations in the first subset.

3. The method of claim 1, wherein the design implementation meets a set of design constraints for the electronic design.

4. The method of claim 1, wherein the timing requirements for the design implementation comprise silicon speed requirements of the design implementation.

5. The method of claim 1, wherein the act of determining the first subset of supply-threshold voltage combinations that meet timing requirements for the design implementation determines the first subset based on delay characteristics specified for the supply-threshold voltage combinations in a lookup table.

6. The method of claim 1, wherein the act of determining amounts of power consumption comprises performing simulation or estimation of switching activity.

7. The method of claim 1, wherein the act of determining amounts of power consumption comprises determining power consumption characteristics for a second subset of supply voltage-threshold voltage combinations; and
    wherein the act of selecting comprises comparing power consumption characteristics for the first subset of supply voltage-threshold voltage combinations with the power consumption characteristics for the second subset of supply voltage-threshold voltage combinations.

8. The method of claim 1, wherein the act of determining amounts of power consumption comprises a static power analysis and a dynamic power analysis.

9. The method of claim 1, wherein the lowest determined amount of power consumption is a minimum amount of dynamic power consumption or a minimum amount of static power consumption.

10. The method of claim 1, further comprising configuring a supply voltage and body bias voltages that regulate the physical implementation of the electronic design using the selected supply voltage-threshold voltage combination.

11. The method of claim 10, wherein the supply voltage is configured using a supply voltage of the selected supply voltage-threshold voltage combination, and the body bias voltages are configured using a threshold voltage of the selected supply voltage-threshold voltage combination.

12. The method of claim 10, wherein the body bias voltages are used to tune transistors in the physical implementation of the electronic design.

13. A system comprising:
    a memory configured to store a selected supply voltage-threshold voltage combination indicating a supply voltage value, a first body bias voltage value, and a second body bias voltage value;
    an integrated circuit;
    a first regulator coupled between the memory and the integrated circuit, wherein the first regulator is configured to regulate a supply voltage of the integrated circuit using the supply voltage value;
    a second regulator coupled between the memory and the integrated circuit, wherein the second regulator is configured to regulate a first body bias voltage of the integrated circuit using the first body bias voltage value; and
    a third regulator coupled between the memory and the integrated circuit, the third regulator configured to regulate a second body bias voltage of the integrated circuit using the second body bias voltage value;

wherein the integrated circuit implements a circuit design and the selected supply voltage-threshold voltage combination provides an optimal amount of power for the circuit design.

14. The system of claim 13, wherein the first and second body bias voltages are for tuning transistors in a physical implementation of the circuit design.

15. The system of claim 13, wherein the memory stores the selected supply voltage-threshold voltage combination as a bitstream.

16. The system of claim 13, further comprising a processor configured to select the supply voltage-threshold voltage combination by:
   determining, from a set of supply voltage-threshold voltage combinations, a subset of supply voltage-threshold voltage combinations that meet timing requirements for the circuit design;
   after determining the first subset of the supply voltage-threshold voltage combinations, performing power analysis to determine an amount of power consumption of the design implementation for each supply voltage-threshold voltage combination in the subset of the supply voltage-threshold voltage combinations; and
   selecting the supply voltage-threshold voltage combination from the subset of supply voltage-threshold voltage combinations based at least in part on a result from the power analysis.

17. The system of claim 13, wherein the first regulator is configured to regulate the supply voltage of the integrated circuit using a supply voltage of the selected supply voltage-threshold voltage combination, and the second regulator is configured to regulate the body bias voltage using a threshold voltage of the selected supply voltage-threshold voltage combination.

18. A non-transitory machine-readable medium having a bitstream, wherein the bitstream is configured to, when input to a programmable integrated circuit (IC):
   cause a first regulator to regulate a supply voltage of the programmable IC using a supply voltage of a selected supply voltage-threshold voltage combination;
   cause a second regulator to regulate a first body bias voltage of the programmable IC using the first body bias voltage value; and
   cause a third regulator to regulate a second body bias voltage of the programmable IC using the second body bias voltage value.

* * * * *